US012585567B2

(12) United States Patent
Dror et al.

(10) Patent No.: US 12,585,567 B2
(45) Date of Patent: Mar. 24, 2026

(54) SYSTEM AND METHOD FOR GENERATING ONE OR MORE AGGREGATION RULES CONFIGURED TO BE UTILIZED BY A LOG COLLECTOR

(71) Applicant: CyberProof Israel Ltd., Tel Aviv (IL)

(72) Inventors: Eliran Dror, Kibutz Gevim (IL); Odelia Cerf, Tel Aviv (IL)

(73) Assignee: CyberProof Israel Ltd., Tel Aviv (IL)

( * ) Notice: Subject to any disclaimer, the term of this patent is extended or adjusted under 35 U.S.C. 154(b) by 569 days.

(21) Appl. No.: 18/152,786

(22) Filed: Jan. 11, 2023

(65) Prior Publication Data

US 2023/0325296 A1      Oct. 12, 2023

Related U.S. Application Data

(60) Provisional application No. 63/329,427, filed on Apr. 10, 2022.

(51) Int. Cl.
 *G06F 11/34*      (2006.01)

(52) U.S. Cl.
 CPC ................................. *G06F 11/3476* (2013.01)

(58) Field of Classification Search
 CPC ............. G06F 11/3476; G06F 2201/81; G06F 2201/86; G06F 11/3082; G06F 17/40
 See application file for complete search history.

(56) References Cited

U.S. PATENT DOCUMENTS

| | | |
|---|---|---|
| 9,105,000 B1 | 8/2015 | White et al. |
| 10,628,180 B1 | 4/2020 | Swanger et al. |
| 2008/0313228 A1 | 12/2008 | Clark et al. |
| 2010/0223499 A1* | 9/2010 | Panigrahy ........... G06F 11/0709 |
| | | 714/E11.178 |
| 2012/0185588 A1 | 7/2012 | Error |
| 2016/0099898 A1 | 4/2016 | Watanabe et al. |
| 2018/0027045 A1 | 1/2018 | Rodrigues et al. |
| 2018/0181645 A1 | 6/2018 | Seiver et al. |
| 2020/0075150 A1 | 3/2020 | Murray et al. |
| 2020/0167841 A1 | 5/2020 | Caldwell |
| 2025/0095243 A1* | 3/2025 | Bicknell, Jr. ........ G06Q 50/265 |
| 2025/0315523 A1* | 10/2025 | Richmond, III ........ G06F 21/56 |

FOREIGN PATENT DOCUMENTS

JP        2017162196 A        9/2017

* cited by examiner

*Primary Examiner* — Mi'schita' Henson
(74) *Attorney, Agent, or Firm* — S.J. Intellectual Property LTD.

(57) ABSTRACT

The presently disclosed subject matter aims to a system and method for generating one or more aggregation rules configured to be utilized by a log collector. The system and method involve an aggregation rules generator directed to allow a log collector to handle the aggregation of gathered log information, even for event logs with previously unobserved behavior patterns.

20 Claims, 2 Drawing Sheets

SYSTEM AND METHOD FOR GENERATING ONE OR MORE AGGREGATION RULES CONFIGURED TO BE UTILIZED BY A LOG COLLECTOR

TECHNICAL FIELD

The present invention relates to the field of log collection.

BACKGROUND

Log collection is the process of collecting log entries (recordings of events of interest that occurred within a computer system or a computerized device) from different sources and bringing them all to a single place. This process, performed by a log collector, can include an aggregation logic, involving one or more rules that can aggregate multiple events into a single event in order to save on storage and processing resources.

Though aggregation logic is commonly used by existing log collection solutions, it is hard to maintain over time since new log sources added to the log collection can have unknown behavior patterns. To address these unknown behavior patterns, existing log collection solutions allow for the manual updating of the one or more rules associated with the aggregation logic, which is inefficient and time-consuming. In addition, in existing log collection solutions, the decision at which time windows to enable the execution of the aggregation rules associated with the aggregation logic is also manually made.

Thus, there is a need in the art for a new system and method for generating one or more aggregation rules configured to be utilized by a log collector.

GENERAL DESCRIPTION

In accordance with a first aspect of the presently disclosed subject matter, there is provided a system for generating one or more aggregation rules configured to be utilized by a log collector, the system comprising a processing circuitry configured to: obtain a plurality of records, each including a plurality of values, wherein each value of the values is associated with a respective feature of a plurality of features; calculate, for at least two of the features, an entropy score based on the values of the plurality of records associated with the respective feature, wherein the entropy score is indicative of an entropy level of the values of the plurality of records associated with the respective feature; identify: (a) one or more low-entropy features of the features, wherein the entropy score of the one or more low-entropy features is below a first threshold, and (b) one or more repeating sequences of values associated with the low-entropy features, wherein the repeating sequences exist within a plurality of given records of the plurality of records; calculate for each repeating sequence of the one or more repeating sequences a repeating sequence score, wherein the repeating sequence score is based on a number of the given records; and generate one or more aggregation rules usable by the log collector to aggregate repeating sequences of the one or more repeating sequences having a repeating sequence score that is above a second threshold.

In some cases, the entropy score for each respective feature is calculated based on the variance level of the values associated with the respective feature.

In some cases, the repeating sequence score of each repeating sequence of the one or more repeating sequences is a division of the number of the given records by a number of the plurality of records.

In some cases, the repeating sequence score of each repeating sequence of the one or more repeating sequences is a count of the repeating sequence in the given records.

In some cases, the score is also based on the average time between appearances.

In some cases, the one or more records are obtained from multiple sources.

In some cases, the each of the one or more aggregation rules is utilized by the log collector at one or more specific time-windows.

In some cases, the specific time-windows for a given repeating sequence of the repeating sequences are determined by analyzing historical information indicative of times of appearance of the given repeating sequence.

In some cases, the processing circuitry is further configured to periodically reassess the historical information in light of a current information, so as to update the one or more specific time windows.

In some cases, the determination of the specific time windows utilizes a supervised machine learning model wherein the count is used as the target label for the model.

In accordance with a second aspect of the presently disclosed subject matter, there is provided a method for generating one or more aggregation rules configured to be utilized by a log collector, the method comprising: obtaining a plurality of records, each including a plurality of values, wherein each value of the values is associated with a respective feature of a plurality of features: calculating, for at least two of the features, an entropy score based on the values of the plurality of records associated with the respective feature, wherein the entropy score is indicative of an entropy level of the values of the plurality of records associated with the respective feature; identifying: (a) one or more low-entropy features of the features, wherein the entropy score of the one or more low-entropy features is below a first threshold, and (b) one or more repeating sequences of values associated with the low-entropy features, wherein the repeating sequences exist within a plurality of given records of the plurality of records; calculating for each repeating sequence of the one or more repeating sequences a repeating sequence score, wherein the repeating sequence score is based on a number of the given records; and generating one or more aggregation rules usable by the log collector to aggregate repeating sequences of the one or more repeating sequences having a repeating sequence score that is above a second threshold.

In some cases, the entropy score for each respective feature is calculated based on the variance level of the values associated with the respective feature.

In some cases, the repeating sequence score of each repeating sequence of the one or more repeating sequences is a division of the number of the given records by a number of the plurality of records.

In some cases, the repeating sequence score of each repeating sequence of the one or more repeating sequences is a count of the repeating sequence in the given records.

In some cases, the score is also based on the average time between appearances.

In some cases, the one or more records are obtained from multiple sources.

In some cases, the each of the one or more aggregation rules is utilized by the log collector at one or more specific time-windows.

In some cases, the specific time-windows for a given repeating sequence of the repeating sequences are determined by analyzing historical information indicative of times of appearance of the given repeating sequence.

In some cases, the processing circuitry is further configured to periodically reassess the historical information in light of a current information, so as to update the one or more specific time windows.

In some cases, the determination of the specific time windows utilizes a supervised machine learning model wherein the count is used as the target label for the model.

In accordance with a third aspect of the presently disclosed subject matter, there is provided a non-transitory computer readable storage medium having computer readable program code embodied therewith, the computer readable program code, executable by at least one processor to perform a method for generating one or more aggregation rules configured to be utilized by a log collector, the method comprising: obtaining a plurality of records, each including a plurality of values, wherein each value of the values is associated with a respective feature of a plurality of features; calculating, for at least two of the features, an entropy score based on the values of the plurality of records associated with the respective feature, wherein the entropy score is indicative of an entropy level of the values of the plurality of records associated with the respective feature: identifying: (a) one or more low-entropy features of the features, wherein the entropy score of the one or more low-entropy features is below a first threshold, and (b) one or more repeating sequences of values associated with the low-entropy features, wherein the repeating sequences exist within a plurality of given records of the plurality of records; calculating for each repeating sequence of the one or more repeating sequences a repeating sequence score, wherein the repeating sequence score is based on a number of the given records; and generating one or more aggregation rules usable by the log collector to aggregate repeating sequences of the one or more repeating sequences having a repeating sequence score that is above a second threshold.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:

FIGS. 1A and 1B are schematic illustrations of exemplary data sets on which a system for generating one or more aggregation rules configured to be utilized by a log collector operates, in accordance with the presently disclosed subject matter:

DETAILED DESCRIPTION

Figure 2:
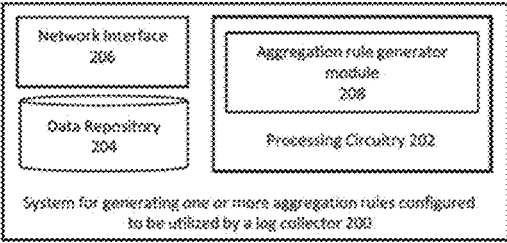
FIG. 2 is a block diagram schematically illustrating one example of a system for generating one or more aggregation rules configured to be utilized by a log collector, in accordance with the presently disclosed subject matter; and, FIG. 3 is a flowchart illustrating an example of a sequence of operations carried out by a system for generating one or more aggregation rules configured to be utilized by a log collector, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "calculating", "identifying", "generating", "reassessing", determining" or the like, include action and/or processes of a computer that manipulate and/or transform data into other data, said data represented as physical quantities, e.g., such as electronic quantities, and/or said data representing the physical objects. The terms "computer", "processor", "processing resource", "processing circuitry", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases". "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figures 1A, 1B:
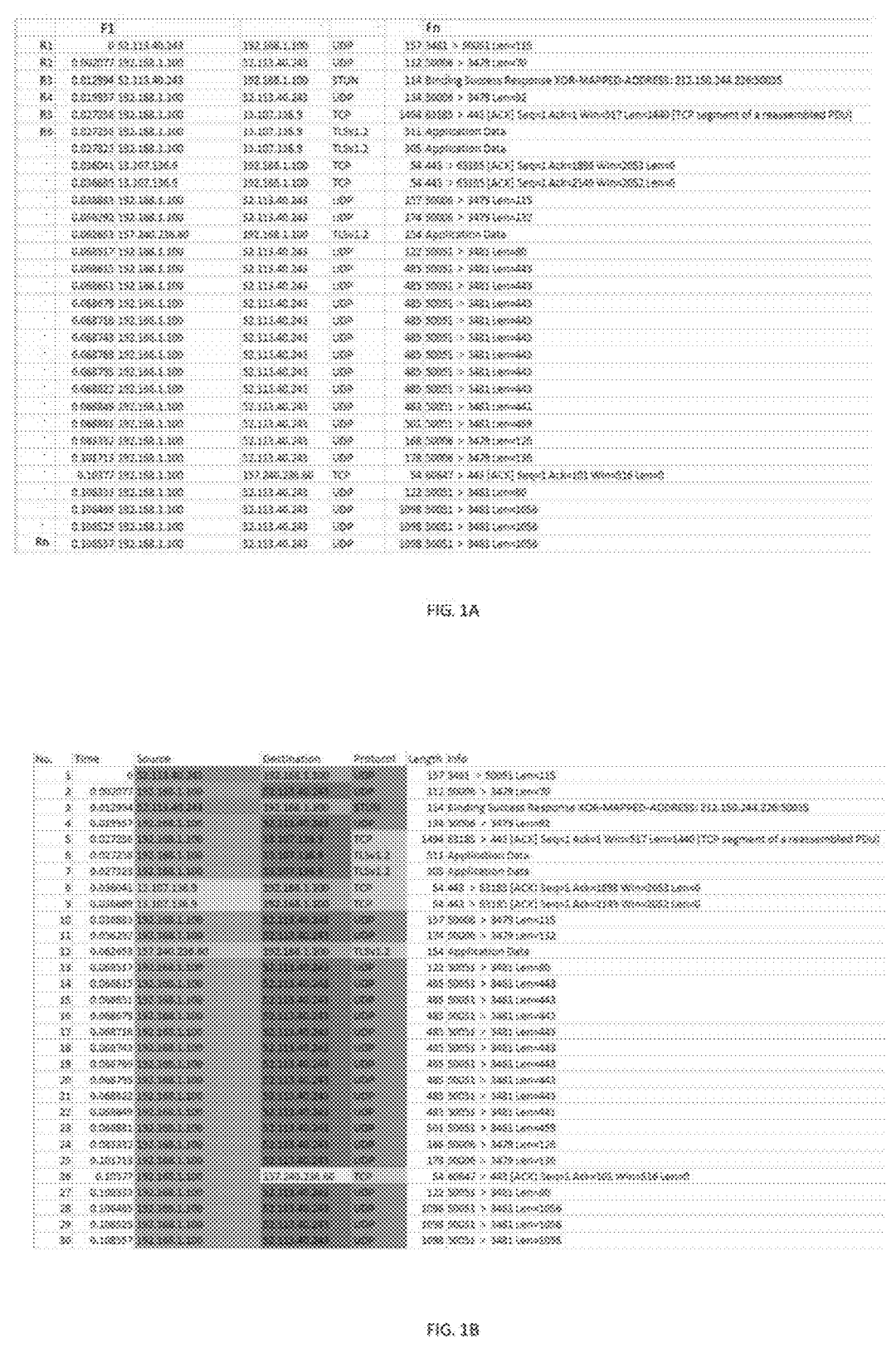
Figure 3:
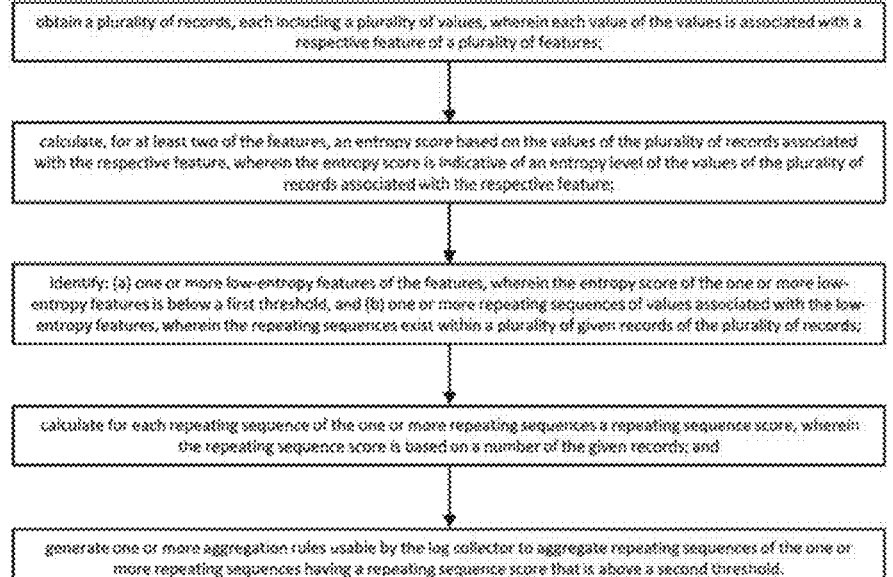

In embodiments of the presently disclosed subject matter, fewer, more and/or different stages than those shown in FIG. 3 may be executed. In embodiments of the presently disclosed subject matter one or more stages illustrated in FIG. 3 may be executed in a different order and/or one or more groups of stages may be executed simultaneously. FIGS. 1A and 1B illustrate a general schematic of the system architecture in accordance with an embodiment of the presently disclosed subject matter. Each module in FIG. 2 can be made up of any combination of software, hardware and/or firmware that performs the functions as defined and explained herein. The modules in FIG. 2 may be centralized in one location or dispersed over more than one location. In other embodiments of the presently disclosed subject matter, the system may comprise fewer, more, and/or different modules than those shown in FIG. 2.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1A, showing a schematic illustration of an exemplary data set on which a system for generating one or more aggregation rules configured to be utilized by a log collector (also interchangeably referred to herein as "system") operates, in accordance with the presently disclosed subject matter.

As shown in the schematic illustration, data set 100 can include a plurality of records, denoted R1 to Rn, representing event logs (i.e., recordings containing information about events associated with usage and operations of operating systems, applications, or devices) attained from a single source or multiple sources (e.g., one or more computer systems, one or more applications, one or more devices, etc.). Each record of the plurality of records may contain a plurality of values, such that each value is associated with a feature of a plurality of features, denoted F1 to Fn.

The plurality of features may define different characteristics of the records, such as the source from which each record was attained, the destination of each attained record, the time in which each record was attained, and the like, and may include features ranging between features of low variance, which are features having values that tend to be repetitive, and features of high variance, which are features having values that tend not to be repetitive. For example, a "time of occurrence of an event" feature can be a feature of high variance, as the probability of attaining different records at the exact same time is relatively low, whereas a "destination" feature, associated with a destination of a communication event, can be a feature of low variance, as the probability of attaining different records directed to the same destination is relatively high.

The existence of features of low variance can yield one or more sub-groups of records of the plurality of records having features consisting of identical values. These one or more sub-groups can be utilized by the system of the presently disclosed subject matter, for example, to save data storage, reduce processing resources, reduce repetitive logs, reduce overall cost and get additional insights of a customer's data and his log sources, etc., as will be explained in further detail hereafter with reference to FIG. 3.

By way of a non-limiting example, as shown in FIG. 1B, data set 100 includes thirty records, each containing seven values associated with the following seven respective features: No. (i.e., number), time, source, destination, protocol, length, and info. Based on the thirty values associated with each feature of the seven features, the source, destination, and protocol features are identified as features of low variance, as each of them includes a repetitive value repeating in at least twenty-one of the thirty records (source=192.168.1.100, destination=52.113.40.243, and protocol=UDP), whereas the remaining four features, No. (i.e., number), time, length, and info features, are identified as features of high variance, as neither of them includes a repetitive value repeating in multiple records.

Attention is now drawn to a description of the components of the system for generating one or more aggregation rules configured to be utilized by a log collector 200.

FIG. 2 is a block diagram schematically illustrating one example of the system for generating one or more aggregation rules configured to be utilized by a log collector 200, in accordance with the presently disclosed subject matter.

In accordance with the presently disclosed subject matter, the system for generating one or more aggregation rules configured to be utilized by a log collector 200 (also interchangeably referred to herein as "system 200") can comprise a network interface 206. The network interface 206 (e.g., a network card, a Wi-Fi client, a Li-Fi client, 3G/4G client, or any other component), enables system 200 to communicate over a network with external systems and handles inbound and outbound communications from such systems. For example, system 200 can receive, through network interface 206, a data set including a plurality of records representing event logs.

System 200 can further comprise or be otherwise associated with a data repository 204 (e.g., a database, a storage system, a memory including Read Only Memory—ROM, Random Access Memory—RAM, or any other type of memory, etc.) configured to store data. Some examples of data that can be stored in the data repository 204 include: data sets of a plurality of records representing event logs, features associated with the plurality of records, values of the features, high-entropy features, low-entropy features, entropy scores of the features, repeating sequences, repeating sequences scores, thresholds (e.g., a first threshold, a second threshold), aggregation rules, etc.

Data repository 204 can be further configured to enable retrieval and/or update and/or deletion of the stored data. It is to be noted that in some cases, data repository 204 can be distributed, while the system 200 has access to the information stored thereon, e.g., via a wired or wireless network to which system 200 is able to connect (utilizing its network interface 206).

System 200 further comprises processing circuitry 202. Processing circuitry 202 can be one or more processing units (e.g., central processing units), microprocessors, microcontrollers (e.g., microcontroller units (MCUs)) or any other computing devices or modules, including multiple and/or parallel and/or distributed processing units, which are adapted to independently or cooperatively process data for controlling relevant system 200 resources and for enabling operations related to system's 200 resources.

The processing circuitry 202 comprises an aggregation rule generator module 208, configured to perform a process, as further detailed herein, inter alia with reference to FIG. 3.

Turning to FIG. 3 there is shown a flowchart illustrating one example of operations carried out by the system for generating one or more aggregation rules configured to be utilized by a log collector 200, in accordance with the presently disclosed subject matter.

Accordingly, the system for generating one or more aggregation rules configured to be utilized by a log collector

200 (also interchangeably referred to hereafter as "system 200") can be configured to perform a process 300, e.g., using aggregation rule generator module 208.

For this purpose, system 200 obtains a plurality of records, for example, the plurality of records of data set 100 described hereinbefore with reference to FIG. 1A, each of which includes a plurality of values, such that each value is associated with a respective feature of a plurality of features (block 302). In a non-limiting example, system 200 obtains data set 100 of FIG. 1B, described hereinbefore.

Once the plurality of records are obtained, system 200 calculates, for at least two features of the plurality of features, an entropy score (indicative of an entropy level of the values of the plurality of records associated with the respective feature) based on the variance level of the values associated with the respective feature (block 304). The entropy score of each feature of the at least two features can be calculated, for example, using the following equation:

$$\text{Entropy}(p) = -\sum_{i=t}^{N} p_i \log_2 p_i$$

It should be noted that the above equation serves as a mere example of a method for calculating the entropy of a given feature and that other methods known in the art for calculating entropy can be used as well.

In accordance with our non-limiting example, system 200 calculates the entropy score of each feature of the seven features of data set 100 of FIG. 1B (i.e., the No. (i.e., number), time, source, destination, protocol, length, and info features), based on the equation above, taking into account all thirty values of each of the features derived from the thirty records of data set 100 of FIG. 1B.

Next, based on the entropy scores calculated for the at least two features, system 200 identifies: (a) one or more low-entropy features, which are features having an entropy score below a first threshold, and (b) one or more repeating sequences of values associated with the one or more low-entropy features, which are sequences existing within a plurality of given records of the plurality of records (block 306).

In accordance with our non-limiting example, system 200 identifies the source, destination, and protocol features of the seven features of data set 100 as low-entropy features since their entropy scores are below a first threshold. In addition, system 200 identifies the following sequences: (i) "192.168.1.100:52.113.40.243:UDP"; (ii) "192.168.1.100:13.107.136.09:TLSv1.2"; and (iii) "13.107.136.9:192.1668.1.100: TDP" (each consisting of a first value associated with the source feature, a second value associated with the destination feature, and a third value associated with the protocol feature) as repeating sequences of values associated with the source, destination, and protocol features, repeating in numerous records of the thirty records of the data set of FIG. 1B. As seen in FIG. 1B, sequence (i) "192.168.1.100:52.113.40.243:UDP" repeats in twenty-one records of the thirty records of the data set of FIG. 1B; sequence (ii) "192.168.1.100:13.107.136.09:TLSv1.2" repeats in two records of the thirty records of the data set of FIG. 1B; and sequence (iii) "13.107.136.9:192.1668.1.100: TDP" repeats in two records of the thirty records of the data set of FIG. 1B.

Upon identifying the one or more repeating sequences, system 200 calculates for each repeating sequence of the one or more repeating sequences a repeating sequence score, based on a number of the plurality of given records (block 308). The repeating sequence score of each repeating sequence can be, for example: (a) a division of the number of the plurality of given records by the number of the plurality of records, or (b) a count of the repeating sequence in the plurality of given records.

In accordance with our non-limiting example, system 200 calculates for each of sequences (i) "192.168.1.100:52.113.40.243:UDP", (ii) "192.168.1.100:13.107.136.09: TLSv1.2", and (iii) "13.107.136.9:192.1668.1.100 TDP" a repeating sequence score based on the count of each repeating sequence in the thirty given records. The repeating sequence score of sequence (i) "192.168.1.100:52.113.40.243: UDP" is twenty-one since it repeats in twenty-one of the thirty records of the data set of FIG. 1B; the repeating sequence score of sequence (ii) "192.168.1.100:13.107.136.09: TLSv1.2" is two since it repeats in two of the thirty records of the data set of FIG. 1B; and the repeating sequence score of sequence (iii) "13.107.136.9:192.1668.1.100: TDP" is also two since it also repeats in two of the thirty records of data set 100 of FIG. 1B.

In cases where the repeating sequence score is calculated based on a division of the number of the plurality of given records by the number of the plurality of records, the calculation can also be based on the average time between appearances. For example, assuming five records containing a given repeating sequence are obtained within a specified period of time, and another record containing the same given repeating sequence is obtained outside the specified period of time, system 200 will calculate the repeating sequence score of the repeating sequence based on its average appearance time. As a result, system 200 will consider only the five records obtained within the specified period of time, as they are close to the average appearance time, and will ignore the record received outside the specified period of time, as it is far from said average.

Based on the repeating sequence score of each repeating sequence, system 200 generates one or more aggregation rules usable by the log collector to aggregate repeating sequences of the one or more repeating sequences having a repeating sequence score that is above a second threshold (block 310).

In accordance with our non-limiting example, system 200 generates an aggregation rule directed to aggregate the repeating sequences of sequence (i) "192.168.1.100:52.113.40.243: UDP", as it is the only sequence of the three sequences (i)-(iii) having a repeating sequence score that is above the second threshold.

In some cases, a log collector can utilize each of the one or more aggregation rules at one or more specific time-windows. The one or more specific time-windows can be determined by analyzing historical information indicative of times of appearance of the given repeating sequence. The historical information can be periodically reassessed in light of current information (e.g., real-time) obtained by the system, so as to update the one or more specific time windows accordingly.

For example, assuming a given sequence is known for repeating in a specific time range within a 24 hours period, system 200 will enable the log collector to utilize the aggregation rule associated with said sequence only during that time.

In some cases, a supervised machine learning model can determine the one or more specific time-windows. The supervised machine can be trained, for example, based on data sets including a plurality of records (such as data set

100, described hereinbefore in relation to FIG. 1A), to identify at least one specific time-window in which at least one sequence repeats itself in an exact amount set as the model's target label. For example, assuming the target label of the model is set to ten, the machine learning model analyzes one or more data sets of a plurality of records, obtained by system 200, in search for a sequence that repeats itself ten times within a specific time window. Once such a sequence is identified, the machine learning model determines the specific time window in which the repetitive sequence was identified as the specific time-window for that particular sequence.

It is to be noted, with reference to FIG. 3, that some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A system for generating one or more aggregation rules configured to be utilized by a log collector, the system comprising:

a network interface configured to receive, from one or more external log sources, a plurality of records, each record including a plurality of values, wherein each value of the values is associated with a respective feature of a plurality of features;

a data repository configured to store the plurality of records, features, associated values, entropy scores, and aggregation rules;

a process circuitry operatively coupled to the network interface and the data repository, the processing circuitry including an aggregation rule generator module, the processing circuitry configured to:

obtain a plurality of records from the data repository;

calculate, for at least two of the features, an entropy score based on the values of the plurality of records associated with the respective feature, wherein the entropy score is indicative of an entropy level of the values of the plurality of records associated with the respective feature;

identify: (a) one or more low-entropy features of the features, wherein the entropy score of the one or more low-entropy features is below a first threshold, and (b) one or more repeating sequences of values associated with the low-entropy features, wherein the repeating sequences exist within a plurality of given records of the plurality of records;

calculate for each repeating sequence of the one or more repeating sequences a repeating sequence score, wherein the repeating sequence score is based on a number of the given records; and generate one or more aggregation rules usable by the log collector to aggregate repeating sequences of the one or more repeating sequences having a repeating sequence score that is above a second threshold, wherein each of the one or more aggregation rules is deployed to the log collector for execution in real-time and is automatically updated in response to periodic reassessment of live operational log data or based on outcomes from a machine learning model trained to predict aggregation time windows.

2. The system of claim 1, wherein the entropy score for each respective feature is calculated based on the variance level of the values associated with the respective feature.

3. The system of claim 1, wherein the repeating sequence score of each repeating sequence of the one or more repeating sequences is a division of the number of the given records by a number of the plurality of records.

4. The system of claim 1, wherein the repeating sequence score of each repeating sequence of the one or more repeating sequences is a count of the repeating sequence in the given records.

5. The system of claim 3, wherein the score is also based on the average time between appearances.

6. The system of claim 1, wherein the one or more records are obtained from multiple sources.

7. The system of claim 1, wherein the each of the one or more aggregation rules is utilized by the log collector at one or more specific time-windows.

8. The system of claim 7, wherein the specific time-windows for a given repeating sequence of the repeating sequences are determined by analyzing historical information indicative of times of appearance of the given repeating sequence.

9. The system of claim 8, wherein the processing circuitry is further configured to periodically reassess the historical information in light of a current information, so as to update the one or more specific time windows.

10. The system of claim 7, wherein the determination of the specific time windows utilizes a supervised machine learning model wherein the count is used as the target label for the model.

11. A method performed by a system comprising a network interface, data repository, and processing circuitry including an aggregation rule generator module for generating one or more aggregation rules configured to be utilized by a log collector, the method comprising:

obtaining a plurality of records via the network interface and stored in the data repository, each including a plurality of values, wherein each value of the values is associated with a respective feature of a plurality of features;

calculating, for at least two of the features, an entropy score based on the values of the plurality of records associated with the respective feature, wherein the entropy score is indicative of an entropy level of the values of the plurality of records associated with the respective feature;

identifying: (a) one or more low-entropy features of the features, wherein the entropy score of the one or more low-entropy features is below a first threshold, and (b) one or more repeating sequences of values associated with the low entropy features, wherein the repeating sequences exist within a plurality of given records of the plurality of records;

calculating for each repeating sequence of the one or more repeating sequences a repeating sequence score, wherein the repeating sequence score is based on a number of the given records; and generating one or more aggregation rules usable by the log collector to aggregate repeating sequences of the one or more repeating sequences having a repeating sequence score that is above a second threshold, wherein each of the one or more generated aggregation rules is automatically deployed in real-time to the log collector and is periodically updated based on live operational log data or results from a machine learning model trained to predict aggregation windows.

12. The method of claim 11, wherein the entropy score for each respective feature is calculated based on the variance level of the values associated with the respective feature.

13. The method of claim 11, wherein the repeating sequence score of each repeating sequence of the one or more repeating sequences is a division of the number of the given records by a number of the plurality of records.

14. The method of claim 11, wherein the repeating sequence score of each repeating sequence of the one or more repeating sequences is a count of the repeating sequence in the number of the given records.

15. The method of claim 13, wherein the score is also based on the average time between appearances.

16. The method of claim 11, wherein the each of the one or more aggregation rules is utilized by the log collector at one or more specific time-windows.

17. The method of claim 16, wherein the specific time-windows for a given repeating sequence of the repeating sequences are determined by analyzing historical information indicative of times of appearance of the given repeating sequence.

18. The method of claim 17, wherein the processing circuitry is further configured to periodically reassess the historical information in light of a current information, so as to update the one or more specific time windows.

19. The method of claim 16, wherein the determination of the specific time windows utilizes a supervised machine learning model wherein the count is used as the target label for the model.

20. A non-transitory computer readable storage medium having computer readable program code embodied therewith, the computer readable program code, executable by at least one processor of a system comprising a network interface, data repository, and processing circuitry including an aggregation rule generator module to perform a method comprising:

receiving, via the network interface, a plurality of records from one or more external log sources and storing the records in the data repository, wherein each value of the values is associated with a respective feature of a plurality of features;

calculating, for at least two of the features, an entropy score based on the values of the plurality of records associated with the respective feature, wherein the entropy score is indicative of an entropy level of the values of the plurality of records associated with the respective feature;

identifying: (a) one or more low-entropy features of the features, wherein the entropy score of the one or more low-entropy features is below a first threshold, and (b) one or more repeating sequences of values associated with the low-entropy features, wherein the repeating sequences exist within a plurality of given records of the plurality of records;

calculating for each repeating sequence of the one or more repeating sequences a repeating sequence score, wherein the repeating sequence score is based on a number of the given records; and generating one or more aggregation rules usable by the log collector to aggregate repeating sequences of the one or more repeating sequences having a repeating sequence score that is above a second threshold.

* * * * *